March 23, 1954

E. WILDHABER 2,672,739

EQUALIZER FOR DISTRIBUTING POWER FLOW TO A PLURALITY OF PARALLEL CHANNELS

Filed Jan. 31, 1950

INVENTOR.
ERNEST WILDHABER
BY
ATTORNEY

March 23, 1954
E. WILDHABER
2,672,739
EQUALIZER FOR DISTRIBUTING POWER FLOW TO A PLURALITY OF PARALLEL CHANNELS
Filed Jan. 31, 1950
4 Sheets-Sheet 2
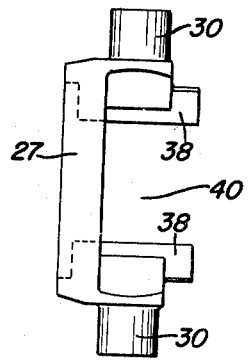
FIG. 7.
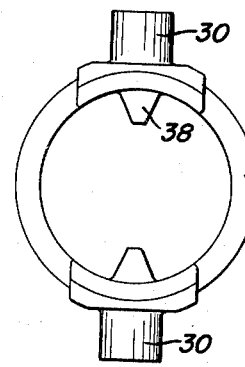
FIG. 8.
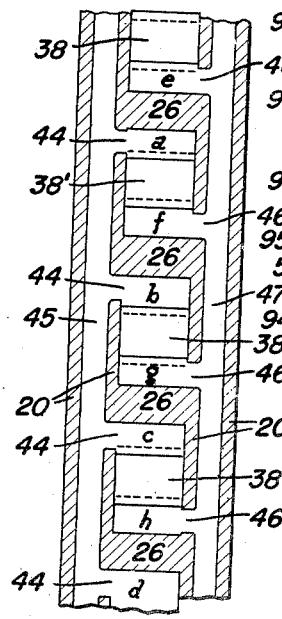
FIG. 9.
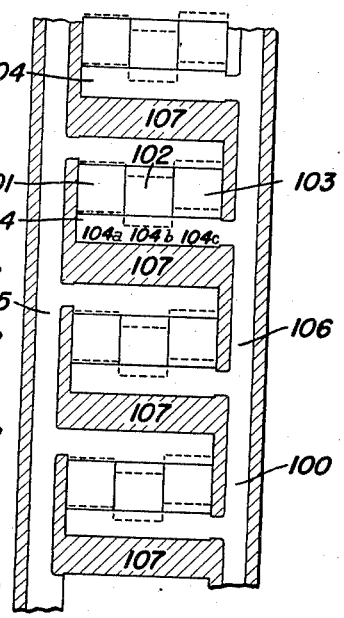
FIG. 15.
FIG. 16.
INVENTOR.
ERNEST WILDHABER
BY
ATTORNEY March 23, 1954  E. WILDHABER  2,672,739
EQUALIZER FOR DISTRIBUTING POWER FLOW
TO A PLURALITY OF PARALLEL CHANNELS
Filed Jan. 31, 1950  4 Sheets-Sheet 3

INVENTOR.
ERNEST WILDHABER
BY
ATTORNEY

INVENTOR.
ERNEST WILDHABER

Patented Mar. 23, 1954

2,672,739

UNITED STATES PATENT OFFICE 2,672,739

EQUALIZER FOR DISTRIBUTING POWER FLOW TO A PLURALITY OF PARALLEL CHANNELS

Ernest Wildhaber, Rochester, N. Y.

Application January 31, 1950, Serial No. 141,457

20 Claims. (Cl. 64—21)

The present invention relates to equalizers for distributing power flow to a plurality of movable parts or channels to average the motions of said parts and to insure that all of the said parts take their respective shares of the loads.

Equalizing mechanism made according to the present invention may be employed in many fields. For instance, it may be used in universal joints and in universal joint drives of the type disclosed in my pending U. S. patent applications Serial Nos. 102,788 and 123,561, filed July 2, 1949 and October 26, 1949, respectively. This equalizing mechanism may be used, also, in equalizing the flow of power through a plurality of identical gear trains disposed in parallel, whether the gears have fixed axes or be members of a planetary gearing. Other uses of the invention will be obvious to those skilled in the art.

In the universal joints and universal joint drives of my pending applications above mentioned a plurality of Cardan-type joint connections are used in parallel to connect two shafts whose axes intersect at an angle. When the axes of the two connected shafts are at an angle, a Cardan-type joint will not transmit truly uniform motion. The motion transmitted fluctuates; and the amount of fluctuation increases with increase of the shaft angularity; and it repeats with every half revolution. In the universal joints and universal joint drives of my applications above mentioned, however, Cardan joints are used which are in parallel and in different phase. The motions transmitted through the two connections therefore fluctuate oppositely. An advance of one from uniform motion position corresponds to a lag of the other from such position. An equalizer is used to average the plurality of fluctuating motions so that the resultant motion is very nearly uniform.

In planetary gearing, difficulty is always experienced in effecting transmission of substantially equal loads through a plurality of planetary countershafts especially where there is more than one gear on each countershaft. Variations in tooth thicknesses or shapes, variation in alignment of the teeth of the planetary gears, variation in mounting distances, etc. will cause unequal transmission of load between the planet gears. Hence an equalizer is desirable in any planetary gearing to insure equal distribution of the power flow between the planet gears.

A primary object of the present invention is to provide a simple, inexpensive equalizing means, capable of use wherever only limited motion is necessary.

Another object of the invention is to provide an equalizing means employing an equalizing medium which is capable of deformation.

Another object of the invention is to provide equalizing means employing an equalizing medium which is capable of flow.

A further object of the invention is to provide a simple and efficient equalizing means employing an enclosed equalizing medium capable of producing fluid pressure.

Another object of the invention is to provide an equalizing means employing a coherent medium capable of producing fluid pressure but which is leak-proof.

A further object of the invention is to employ rubber, natural or synthetic, and rubber-like products in a novel way as an equalizing medium so as to provide essentially a leak-proof fluid capable of limited motion for equalizing powerflow between a plurality of parts.

Another object of the invention is to provide an equalizer capable of limited motion using an enclosed medium which is capable of producing fluid pressure and which is so designed as to take up lateral pressure at opposite sides of the medium by parts which are rigidly secured together, the purpose being to relieve the working surfaces of the movable parts from taking up fluid pressure which would multiply friction.

A still further object of the invention is to devise suitable means for equalizing power flow in uniform motion universal joints and universal joint drives, such as disclosed in my patent applications above mentioned, where the motion is transmitted through a plurality of joint connections in parallel, and where there is a phase difference in these connections.

Other objects of the invention are to provide an equalizing means for universal joints, based on fluid pressure and an equalizing means which may be used at the point of intersection of the axes of the joint.

Other objects of the invention will be apparent hereinafter from the specification and from the recital of the appended claims.

Figure 3:
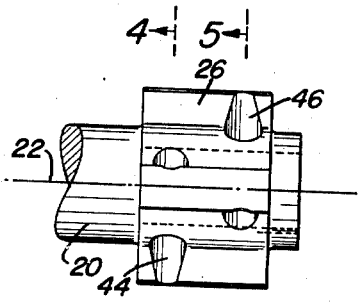
Fig. 3 is a side elevational view of one of the end members of the joint.
Figure 4:
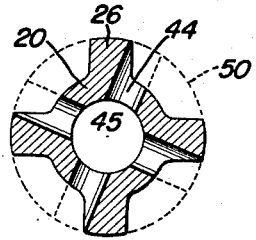
Figure 5:
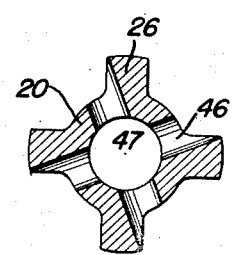
Figure 6:
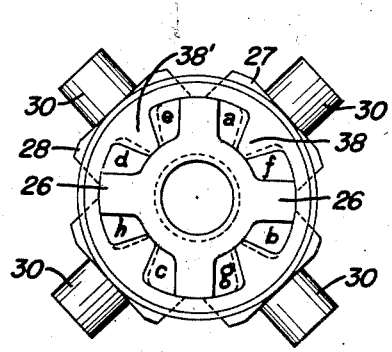
Figure 10:
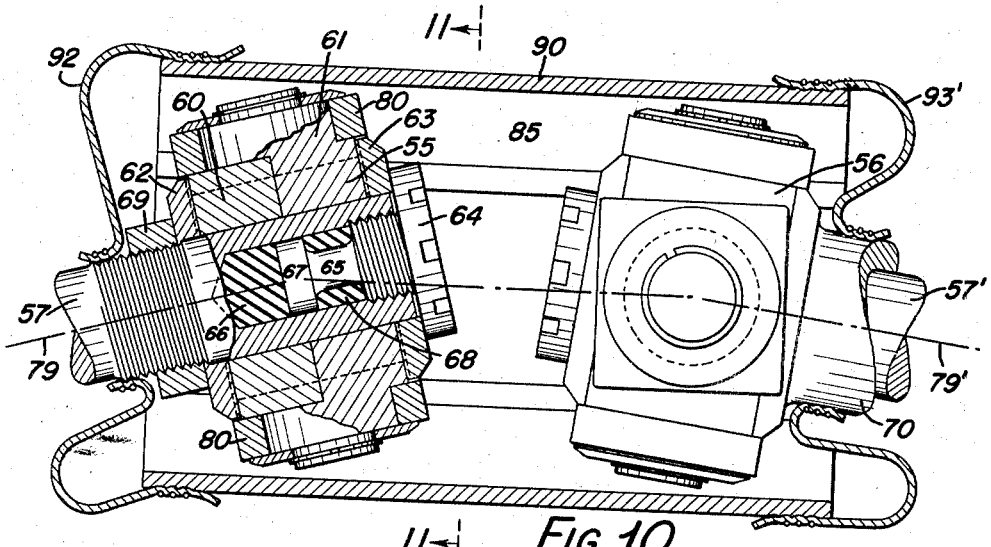
Figure 11:
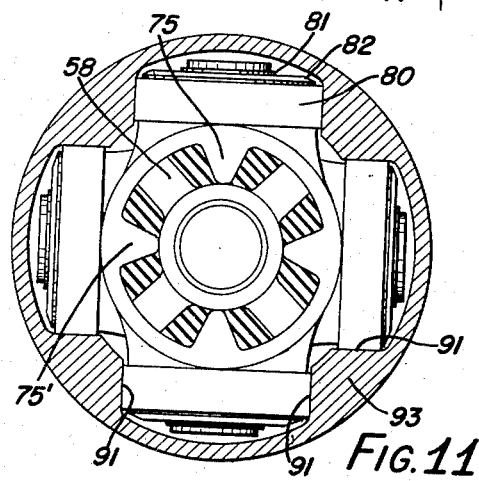
Figure 12:
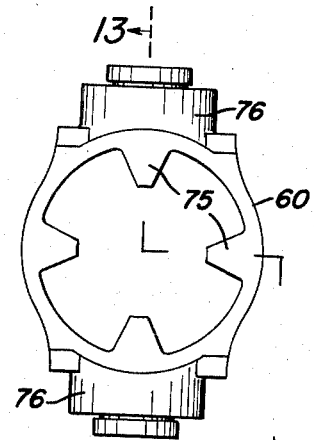
Figure 13:
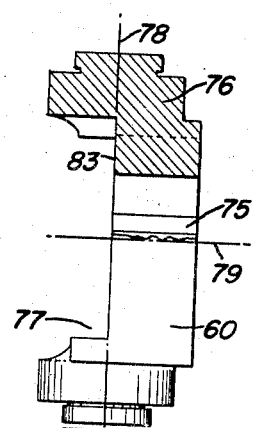
Figure 14:
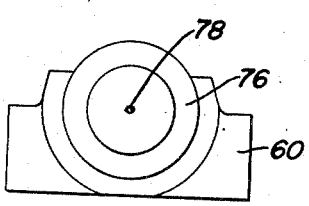
Figure 17:
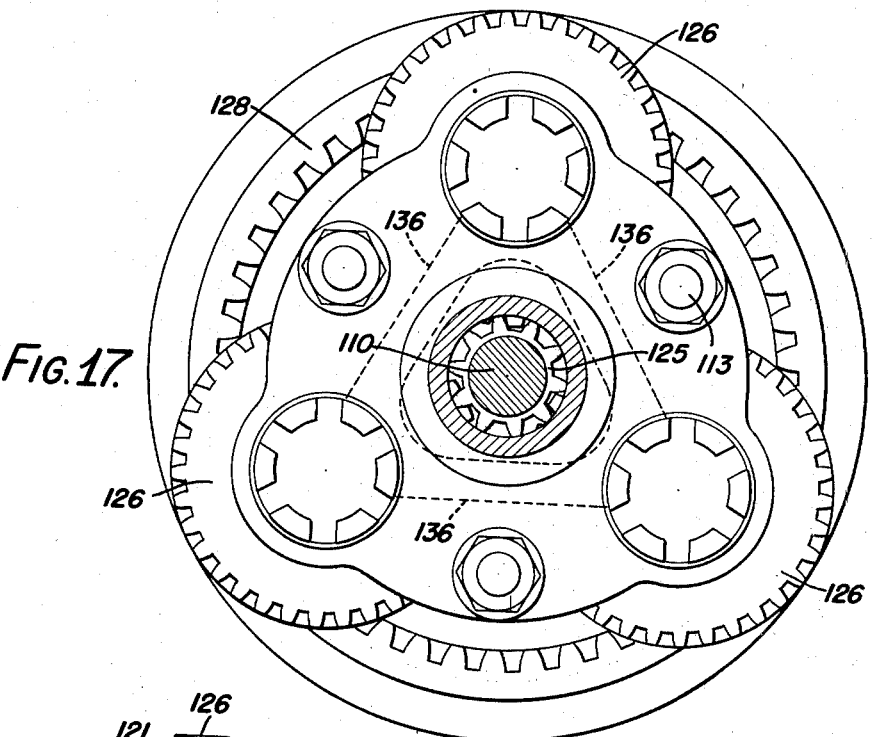
Figure 18:
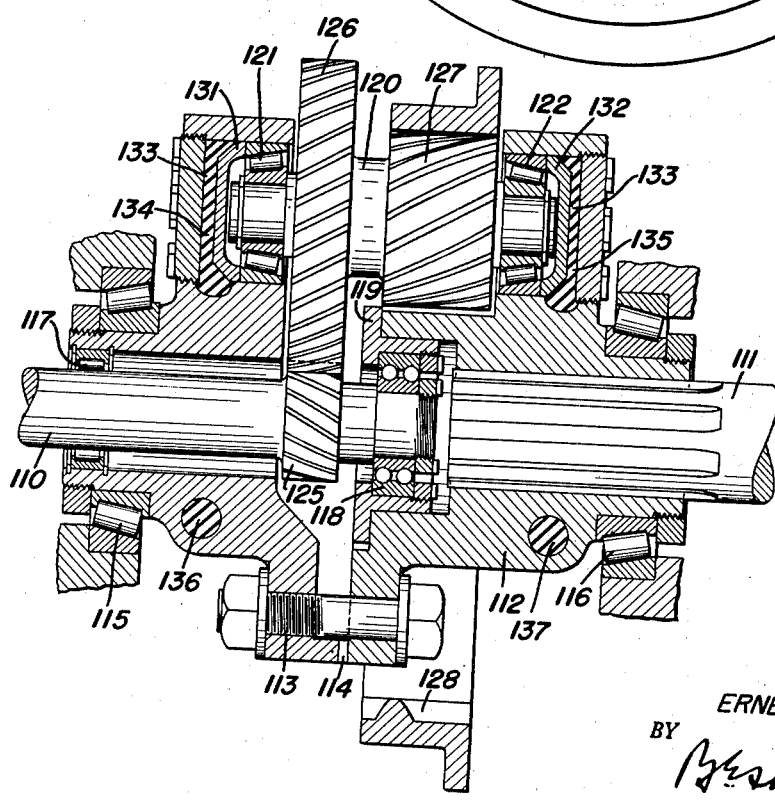

Figs. 4 and 5 are sectional views on the lines 4—4 and 5—5, respectively, of Fig. 3;

Fig. 6 is a diagrammatic end view showing one of the end members of the joint and the two co-operating ring members, illustrating their relative motions and how the equalizing medium of the present invention is used;

Figs. 7 and 8 are a side elevation and an axial view, respectively, of one of the ring members used in this embodiment of the invention;

Fig. 9 is a diagrammatic view illustrating the operation of the equalizing means shown in Figs. 1 to 8 inclusive;

Fig. 10 is an axial sectional view of a universal joint drive made according to the invention and embodying two universal joints, each of which employs modified equalizing means, one of these joints being shown partially in section and partially in elevation, and the other joint being shown in elevation;

Fig. 11 is a section taken generally on the line 11—11 of Fig. 10, with the joint axes in alignment and with some of the parts removed in order to show the structure;

Fig. 12 is an axial view of one of the ring members used in this universal joint drive;

Fig. 13 is a part section, part elevational view of this ring member taken on the line 13—13 of Fig. 12;

Fig. 14 is a view looking at the bottom of this ring member;

Fig. 15 is a diagrammatic view illustrating the operation of the equalizing means in one of the universal joints of the drive of Figs. 12 to 14;

Fig. 16 is a diagrammatic view illustrating a further modification of the invention; and Figs. 17 and 18 are an end elevation and an axial sectional view, respectively, of a planetary gearing in which equalizing means constructed according to this invention is employed.

Reference will now be made first to the embodiment of the invention illustrated in Figs. 1 to 9 inclusive. Here the invention is shown as applied to a universal joint. The two end members or shafts which are connected by the joint are designated at 20 and 21, respectively. They are rotatable on axes 22 and 23, respectively, which intersect in point 24. The angle 25 between the axes, of course, may vary in operation.

This joint may be used in two ways. At a given angle 25 the two end members 20 and 21 may either turn on fixed axes 22 and 23, or one end member may be fixed while the other end member performs a planetary motion about the fixed member, that is, it is moved bodily about the axis of the fixed end member while it turns on its own axis. In both cases there is a relative turning motion about the intersecting axes 22 and 23.

Figure 2:
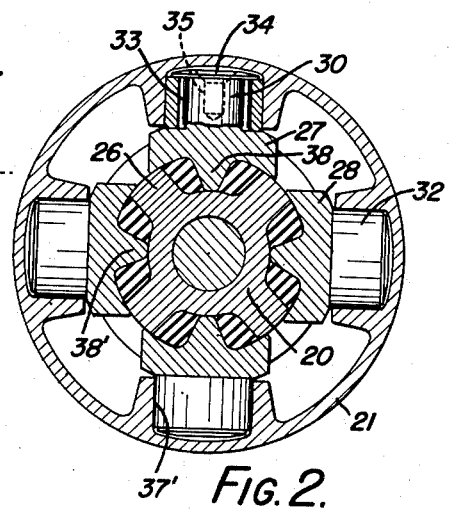
Fig. 2 is a transverse section, with parts broken away, taken substantially on the line 2—2 of Fig. 1 when the two axes of the joint are in alignment.

End member 20 is formed with four straight external projections or splines 26. Mounted for oscillation about the axis 22 relative to one another and to the end member 20 are two ring members 27 and 28. These ring members are alike; and each has a pair of diametrically disposed coaxial pivot studs 30 which project outwardly from its ring portion. A roller 32 is journaled on each of these studs by means of a needle bearing 33 (Fig. 2). The rollers are held on the studs by caps 34 which are secured in position by screws 35.

Figure 1:
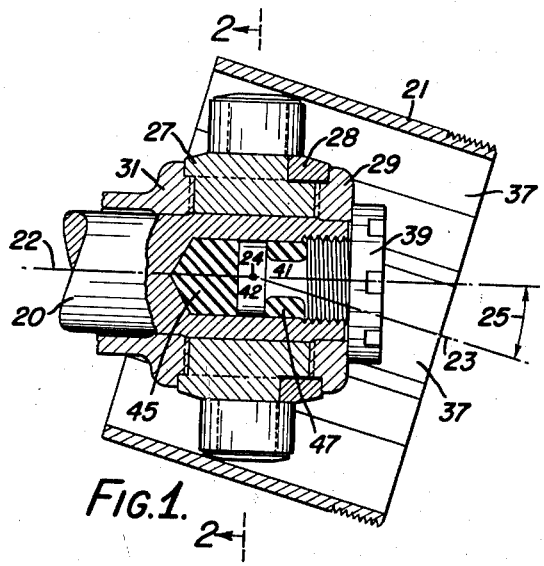
Fig. 1 is a part axial section, part elevational view of a uniform motion universal joint constructed according to one embodiment of the present invention and containing my novel equalizer.

Each ring member 27 and 28 has an inward projection or lug radially opposite each pivot stud 30. The inward projections of the two ring members are denoted at 38 and 38', respectively. The ring members 27 and 28 are recessed on confronting faces, as indicated at 40 in Fig. 7, so that they may be interengaged axially as shown in Fig. 1 and mounted on the outside of the splines 26 of the end member 20, with their projections or lugs 38, 38' extending into the spaces between alternate pairs of splines 26 of the end member 20.

The ring members are held against axial movement relative to the end member 20 by a disc 29 and a spacer 31. Both these parts are rigidly secured to the end member 20. Thus the spacer 31 may be seated against a shoulder (not shown) on the end member, while the disc 29 is held against axial movement relative to the end member by the head 39 of a bolt 41 that is threaded into a counter-bore in the end member 20. Both the disc 29 and the spacer 31 have shallow radial slots in their confronting end faces to engage and fit the end faces of the splines 26 of the end member 20 to secure the disc and spacer against rotation relative to the end member.

The projections 38, 38' of the ring members are of less angular extent, as clearly shown in Fig. 2, than the spaces between adjacent splines 26 of the end member 20. With the present invention, the spaces between the splines 26 of the end member and the inward projections 38, 38' of the ring members are filled with a medium capable of deformation and capable of producing fluid pressure when enclosed. A fluid, such as hydraulic oil, may be used provided that it is enclosed within suitable means to prevent leakage. Preferably a coherent, deformable substance is used such as rubber, synthetic or natural, or a rubber-like substance, which when enclosed acts sufficiently like an incompressible fluid for the small displacements that occur in a universal joint such as described. A coherent substance will, of course, not leak. Moreover, it tends to absorb noise and to dampen vibrations.

The deformable medium fills the chambers $a$, $b$, $c$, $d$ (Fig. 6) formed between one side of the splines 26 and the adjacent sides of the projections 38 or 38' as well as the chambers $e$, $f$, $g$, and $h$ formed between the opposite sides of the splines and the opposite sides of the projections. The bolt 41 referred to above, which threads into the counterbore of end member 20, is formed at its inner end with a plug-like head 42. This head is of the same diameter as the internal diameter of the counterbore and fits tightly into the counterbore. It acts as a partition between the front and rear parts of the counterbore, thereby forming two chambers 45 and 47. The chambers $a$, $b$, $c$, and $d$ on one side of splines 26 are interconnected through passages 44 (Fig. 4) drilled radially in the end member 20 which lead into the central chamber 45 of this end member. In similar manner, the chambers $e$, $f$, $g$ and $h$ on the opposite side of the splines are connected by passages 46 in the end member 20 which lead to the central chamber 47. There is, therefore, no communication between the chambers $a$, $b$, $c$ and $d$ and the chambers $e$, $f$, $g$ and $h$. The specified connection between these several passageways and the separation of the two sets of passageways from one another is an important feature of the invention.

The universal joint illustrated in Figs. 1 to 9 inclusive has freedom to move axially, that is, end member 21 may move along its axis 23 without affecting the turning motion. For this purpose, the end member 21 is provided with four equi-spaced straight, internal grooves 37. These grooves extend parallel to the axis 23 of this end member and have parallel plane sides 37'. The rollers 32 engage in these grooves.

When the universal joint is in use connecting two end members 20 and 21 whose axes are disposed at an angle with reference to one another, the ring members 27 and 28 oscillate slightly in opposite directions with respect to the end member 20; the projections 38 and 38' moving simultaneously toward a spline 26 and then simultaneously away from it. Two relative positions thus attained by the inward projections 38, 38' are indicated in full and in dotted lines in Fig. 6. In the dotted line position, the volume of the chambers $a$ and $c$ has been reduced while the volume of the chambers $b$ and $d$ has been increased by an amount equal to the amount of reduction in the chambers $a$ and $c$. Likewise, the volume of chambers $e$ and $g$ has been reduced while the volume of the chambers $f$ and $h$ has been increased, the total volume of the chambers remaining, however, the same. For each half turn of the universal joint there is a motion cycle. This motion is made possible by interconnecting the chambers $a$, $c$ on the drive side of the ring member 27 with the chambers $b$, $d$ on the drive side of the ring member 28. Similarly, the chambers $f$, $h$ on the coast side of ring member 27 are connected with the chambers $e$, $g$ on the coast side of ring member 28.

Since the equalizing medium is fully enclosed it acts essentially as an incompressible liquid in the embodiment of the invention described. Only minor use is made of its elastic properties.

The action of the fluid equalizing medium is further illustrated in the diagram of Fig. 9 which can be considered a development of the peripheries of the respective members into a plane. Here the central chambers 45 and 47 are indicated on the side of end member 20. The passages 44 leading from chamber 45 connect all the drive side chambers $a$, $b$, $c$, $d$; while the passages 46 leading from chamber 47 connect all the coast side chambers $e$, $f$, $g$, $h$. When the projections 38 and 38' of the ring members 27 and 28 move from the full line positions shown to the dotted line positions, chambers $e$, $a$, $g$, and $c$ decrease in size while chambers $f$, $b$, $h$ and $d$ increase in volume. For simplicity the medium, which fills the chambers, is omitted in Fig. 9.

To avoid whip, care should be taken that the chambers and connected passages are fully filled with the fluid medium. Entrapment of air should be avoided by providing means for escape for all air the same way as in a conventional hydraulic system. The equalizing medium may be introduced into the system in a pourable state with the ring members 27, 28 held in their central positions on end member 20. There usually is some slight change in volume when a medium changes from its pourable state to its final, coherent state. To allow for shrinkage more of the medium should be poured than the amount which fills the chambers and passages exactly. To take care of expansion, the chambers are filled not quite to the brim.

For filling the chambers and passages, a disclike part may be used with openings or holes whose profile matches the profile of the chambers between the splines and the projections. This part may be temporarily secured to the end member 20 in place of the disc 29 in order to extend the axial length of the chambers. The equalizing medium is then poured in until it reaches the proper distance into this part which provides a temporary continuation of the chambers.

To keep the stresses down I preferably use little or no pre-load in the completely filled fluid chambers and passages after they are filled. Pressure may be used in manufacture if desired. After the medium has reached its final coherent state it may be checked as to the exact degree to which it fills the chambers. If there is a little more medium present than exactly fills the volume provided, a shorter central bolt 41 may be used in place of the standard bolt used in pouring. The thickness of the plug portion 42 of the bolt can be reduced. The difference in thickness should correspond to the excess volume of the medium. Similarly, a longer bolt is used to compensate for a slight lack of volume of the medium.

While I prefer to use the medium fully enclosed to produce fluid pressure as described, it is within the scope of my invention to use an elastic medium which does not completely fill the spaces provided therefor. In such case, the joint has a plurality of roller journals which are movable relative to an end member and relative to one another about the axis of the end member and which are connected with the end member through elastic means.

The holes 44 and 46 are preferably drilled in the end member 20 before the splines 26 are cut in the end member so as to avoid one-sided pressure on the drills used in making the holes. That is, they are drilled in the cylindrical body indicated in dotted lines at 50 in Fig. 4. All four holes may be drilled simultaneously with a multiple drill set-up.

In operation, substantial pressures are created in the chambers filled with the fluid medium. It should be noted that the side pressures are taken up by the parts 29 and 31 which are rigidly secured to the end member 20. The ring members 27 and 28 receive only driving pressure and radial pressure. The latter pressure is balanced within each ring member itself. None of the parts is pressed against a guide surface by pressure of the equalizing medium. Therefore, the friction is kept at a minimum.

Another embodiment of the invention is illustrated in Figs. 10 to 15 inclusive. Here a universal joint drive is shown which permits radial, axial and angular misalignment of the two shafts 57 and 57' connected thereby. This drive or universal coupling comprises two uniform motion universal joints, which are denoted at 55 and 56, respectively, and a connecting sleeve 99 having four equally spaced straight guideways 85. Each of the joints 55 and 56 contains my novel equalizing means.

The two joints are alike except for minor, obvious details. A description of one thus will do for both. End member or shaft 57 is formed, as in the first described embodiment of the invention, with four spaced projections or splines 58. Mounted on these splines are, as in the first described embodiment of the invention, two ring members 60 and 61. These ring members are again axially fixed relative to the end member 57 by discs 62 and 63. These discs again have opposing faces formed with shallow grooves that fit the ends of the splines 58 so that the discs themselves are held against rotation relative to the end member 57.

Disc 63 is pressed against one end of the spline by the head 64 of a bolt 65 that is threaded into a central counter-bore in the end member 57. The disc 62 is pressed against the opposite end of the splines 58 by a nut 69 which threads onto the end member 57. Instead of this nut, a spacer 70 is used in the joint 56 which spacer is rigidly secured to the end member 57'. A nut may be used, however, in the case of the joint 56, also, if desired. Bolt 65 has a plug portion 67 at its inner end which again acts as a partition member to divide the counter-bore into two chambers 66 and 68 for the equalizing medium.

The two ring members 60 and 61 are identical. Each comprises a ring-shaped body portion whose thickness is about half the length of the splines 58; and each is recessed as denoted at 77 in Fig. 13 so as to nest with the other ring member. Each ring member has inwardly projecting lugs extending axially thereof. These lugs are denoted at 75 and 75', respectively. The ring members of this embodiment of the invention differ from the ring members of the previously described embodiment in that each has four lugs instead of only two. At diametrically opposite sides each ring member is formed with coaxial cylindrical bearing portions 76. The axis 78 of these bearing portions is at right angles to axis 79 of the ring member and lies in the plane 83 of the ring member. The bearing portions 76 themselves project laterally beyond this plane in a manner so as not to interfere with the other ring member but to permit its relative motion. After assembly of the rings on the end member 57 the axes 78 of the two rings intersect and intersect the axis 79 of the end member 57 in the same point.

Mounted on each bearing portion 76 is a sliding block 80. A snap ring 81 and disc 82 serve to hold each block on its bearing portion. A roller may be used in place of the block if desired.

The coaxial sliding blocks 80 engage diametrically opposite guideways 85 formed in the sleeve 90. This sleeve has four guideways 85 which are equally spaced about the axis of the sleeve. They extend along the sleeve axis and have parallel plane sides 91. In the embodiment shown a novel form of sleeve is used. It contains as many projections 93 as there are grooves. The projections are like internal teeth whose opposite plane sides are the plane sides 91 of the adjacent grooves or guideways.

The chambers between the splines 58 and the projections 75, 75' of the two ring members are filled, as in the first described embodiment of the invention, with a deformable medium capable of transmitting fluid pressure, preferably with a coherent elastic medium, such as rubber, natural or synthetic.

Dust and grease seals 92 and 93', preferably made of a synthetic rubber are secured at opposite ends to the sleeve 90 and to the shafts 57 and 57' in known manner with wires. The seals serve to hold the sleeve 90 approximately centrally between the two joints regardless of the axial distance between the two joints. To disassemble the joints, one of the seals is removed. The sleeve 90 is then shifted axially toward the opposite joint until the joint adjacent the removed seal is clear.

Both described embodiments of the invention lend themselves to quantity production at low cost. The splines of the end member are unobstructed and can be broached simultaneously. Likewise, the internal shape of the ring members can be broached efficiently.

In Fig. 15, the equalizing means of one member of the universal joint is shown in development. In the embodiment of Figs. 10 to 15 inclusive the projections 75, 75' of the ring members are arranged side by side. Here connecting passages are not absolutely necessary and are omitted in the diagram of Fig. 15. The chamber 94a on the drive side of one ring member 60 is already in direct connection with the chamber 94b on the drive side of the other ring member 61. This is also true for all other chambers on the drive side ring members. Similarly each chamber 95a on the opposite or coast side of ring member 60 is in direct contact with the adjacent chamber 95b on the coast side of the ring member 61.

In operation, the gain in volume of each chamber 94a is equal to the loss in volume of each chamber 94b and vice versa. Likewise the gain in volume of each chamber 95b is equal to the loss in volume of each chamber 95a and vice versa. For simplicity, the equalizing medium is omitted from Fig. 15.

While connecting channels or passages are not necessary for operation of the embodiment shown in Figs. 10 to 15 inclusive they are still desirable. The connecting channels are a guarantee that substantially the same pressure exists in all drive side chambers and that all the projections are equally loaded.

Fig. 16 illustrates diagrammatically a case with more than two individual ring members. Operatively connected to a common member 100, which has splines 107, are three ring members. Their projections 101, 102 and 103 are arranged side by side, adjacent one another. Dotted lines indicate simultaneous relative positions attained by the projections with respect to the common member 100 in operation. While the individual parts 104a, 104b and 104c of a chamber 104 change in volume, the chamber as a whole retains a constant volume, and so do all other chambers. Connecting channels 105 and 106 between the chambers are desirable but not necessary.

Reference will now be made to Figs. 17 and 18 for disclosure of an embodiment of the invention in which the equalizing mechanism of the present invention is applied to a planetary transmission and serves for transmitting substantially equal power through a plurality of substantially identical channels, namely, identical gears in parallel. Here a plurality of identical geared counter-shafts are used to transmit substantially equal power through all of said counter-shafts by use of my equalizer. The example specifically illustrated relates to planetary gearing where the counter-shafts and its gears revolve about a common axis. However, the invention applies also when the counter-shafts have fixed axes.

If we assume that the drive illustrated is a planetary gear reduction, then 110 is the central input shaft and 111 the central output shaft. The shaft 111 is secured by splines to the planet carrier 112. This carrier may be made in two parts secured together by bolts 113 and a toothed face coupling 114.

The planet carrier 112 is journaled in spaced anti-friction bearings 115 and 116. The input shaft 110 is journaled in the planet carrier on spaced, anti-friction bearings 117 and 118. The bearing 118 is held in an insert 119 which is rigidly secured to the carrier by screws (not shown). Each of the counter-shafts 120 is journaled in the planet carrier on two spaced, anti-friction bearings 121 and 122. The input shaft 110 has a helical pinion 125 formed integral with it. This pinion meshes with three helical gears 126, each of which is integral with one of the counter-shafts 120. Also integral with each counter-shaft 120 is a helical pinion 127. The three helical pinions mesh with a stationary internal helical gear 128.

The two gears 126 and 127 of each countershaft are shown as having the same helix angle. Since the two gears are different in diameter the lead of the teeth is different on the two gears. Accordingly the axial thrust exerted on the two gears 126 and 127 is unequal. The difference of thrust has to be taken up by the bearings. Bearing 121 takes up the thrust to the left, while bearing 122 takes up the thrust to the right. The bearings 121 and 122 are held axially by cups 131 and 132. Each cup is backed up and supported by a deformable coherent medium 133 such as is used in the previously described embodiments of the invention. The spaces or chambers 134 back of the cup 131 are interconnected through passages or ducts 136, shown in dotted lines in Fig. 17 and in section in Fig. 18. Similarly, the chambers 135 back of the cups 132 are interconnected through passages or ducts 137.

The chambers and passages are completely filled with the equalizing medium. The fully enclosed medium acts essentially like a leak-proof fluid. It lets the volume of the chambers be adjusted until the pressure is the same in all of the chambers of one side, namely, the side which takes the driving thrust. In this adjustment the countershafts 120 are moved axially until the same load is transmitted through each of them.

Heretofore it has been very difficult to effect transmission of substantially equal loads through three countershafts especially where each countershaft has more than a single gear secured to it. Highest precision has been required not only in formation of the tooth shapes of the gears themselves but also in their mounting in the relative position of the teeth of the two coaxial planets, and even in the tooth thickness. To obtain the desired results, heretofore, the three countershafts with their coaxial gears had to be identical to the highest degree in all respects and their mountings had to be identical. Such precision in manufacture and mounting is very costly to achieve and has been a detriment to the adoption of planetary transmissions with multiple countershafts where compact, light design has been desired.

With the equalizer of my invention, the tolerances can be relaxed. The conventional tolerances for mounting distance are sufficient; and no harm results when the teeth of the three planet members are not exactly of the same thickness and when the teeth of the two coaxial planet gears are not exactly in the same alignment on all the planet members. Through my invention drives with multiple equal countershafts are no more difficult to manufacture than drives with a single countershaft. The equalizing means of the present invention automatically distributes the load equally on the countershafts. The cost of the equalizing medium is a small item as compared with the savings which its use effects. In the embodiment of the invention illustrated in Figs. 17 and 18 the equalizing medium equalizes the axial thrust of the three countershafts; and with equal axial thrust, equal torque is of necessity transmitted. If the gears have perfect teeth without error and without eccentricity then the equalizer merely performs an adjustment, namely, the adjustment required to insure that equal loads are transmitted despite any variation of center distance or variation in alignment of the two sets of teeth of coaxial planetary gears, or variation in tooth thickness of the different planets.

Tooth profile errors and eccentricity cause a periodic motion in the equalizing medium. The motion transmitted through the three countershafts is averaged, and the average motion is transmitted to the output shaft. In principle, then, the motion is averaged and improved. The influence of eccentricity, for instance, is entirely eliminated. The amount of correcting motion is quite small in practice since today gears can be made quite accurately in commercial productions. The chief advantage of my equalizing medium in the application to planetary gears is the achievement of equal load distribution on all the countershafts without requiring cumulative close tolerances. This means production at low cost.

While the invention has been described in connection with certain specific embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. Mechanism for transmitting power through a plurality of operative connections in parallel, comprising a common member and a plurality of individual members rotatably mounted on said common member and movable relative to said common member and relative to each other, a rotatable part with which said individual members are operatively connected, a plurality of angularly spaced projections formed on said common member, a plurality of angularly spaced projections formed on each of said individual members and extending into the spaces between the projections of said common member, means on said common member and said individual members enclosing the spaces between the projections of said common member and the projections of said individual members, thereby forming a plurality of chambers, the chambers formed on the same side of the projections of the common member connecting with each other, and the chambers formed on one side of the projections of the common member being separate from the chambers formed on the other side of the projections of the common member, and a deformable medium completely filling said chambers.

2. Mechanism for transmitting power through a plurality of operative connections in parallel, comprising a common member and a plurality of individual members rotatably mounted on said common member and movable relative to said common member and relative to each other, a rotatable part with which said individual members are operatively connected, a plurality of angularly spaced projections formed on said common member, a plurality of angularly spaced projections formed on each of said individual members and extending into the spaces between the projections of said common member, means on said common member and on said individual members enclosing the spaces between the projections of the common member and the projections of the individual members, thereby forming a plurality of chambers, said members being provided with enclosed connecting passages connecting the chambers formed on the same side of the projections of the common member, and a deformable medium completely filling all of said chambers and passages.

3. Mechanism for transmitting power through a plurality of operative connections in parallel, comprising a common member and a plurality of individual members rotatably mounted on said common member coaxially therewith and rotatable relative to said common member and relative to each other, a rotatable part with which said individual members are operatively connected, a plurality of angularly spaced projections formed on said common member, a plurality of angularly spaced projections formed on each of said individual members and extending into spaces between the projections of said common member, and forming with the projections of said common member chambers, means rigid with one of said members for closing said chambers at both ends axially of said members, and means for closing said chambers at their outsides radially of the axis of said common member, said common member being provided with enclosed passages connecting said chambers, and a deformable medium filling said chambers and passages.

4. Mechanism for transmitting power through a plurality of operative connections in parallel, comprising a common member and a plurality of individual members rotatably mounted on said common member coaxially therewith and rotatable relative to said common member and relative to each other, a rotatable part with which said individual members are operatively connected, a plurality of angularly spaced projections formed on said common member, a plurality of angularly spaced projections formed on each of said individual members and extending into spaces between the projections of said common member and forming with the projections of said common member chambers, portions rigid with said common member for closing said chambers at both ends axially of said common member, and means on said individual members enclosing said chambers at the outside radially of the axis of said common member, and a deformable coherent medium completely filling said chambers to retain their total volume substantially constant.

5. Mechanism for transmitting power through a plurality of operative connections in parallel, comprising a common member and a plurality of individual members mounted for rotary movement relative to said common member and relative to each other about a common axis, a rotatable part with which said individual members are operatively connected, a plurality of angularly spaced projections formed on said common member, a plurality of angularly spaced projections formed on each of said individual members and extending into the spaces between the projections of said common member and forming with the projections of said common member two separate groups of chambers, portions rigid with said common member closing said chambers at both ends axially of said common member, means rigid with said individual members for closing said chambers at their outsides radially of said common axis, one of said groups being disposed on the driving side and the other of said groups being disposed on the opposite side, the chambers of each group communicating with one another but being separated from the chambers of the other group, and a deformable medium filling each of said groups.

6. In combination, a common member, a plurality of individual members mounted for movement relative to said common member and relative to each other about a common axis, angularly spaced projections provided on all said members, the projections of said individual members extending into spaces between the projections of said common member and forming chambers between said common member and each of said individual members, portions rigid with said common member closing said chambers at both ends axially of said common member, means for closing said chambers at their outsides radially of said common axis, said chambers being arranged in a circle about said axis, the chambers formed between said common member and one individual member alternating with the chambers formed between said common member and the other individual member, and a deformable medium filling all said chambers.

7. In combination, a common member, a plurality of individual members mounted for movement relative to said common member and relative to each other about a common axis, angularly spaced projections provided on all said members, the projections of said individual members extending into spaces between the projections of said common member and forming chambers between said common member and each of said individual members, portions rigid with said common member closing said chambers at both ends axially of said common member, means for closing said chambers at their outsides radially of said common axis, said common member having passages formed therein connecting the chambers on one side of the projections of said common member, said chambers being arranged in a circle about said axis, and a deformable medium filling said chambers.

8. In combination, a common member, a plurality of individual members mounted for movement relative to said common member and relative to each other about a common axis, angularly spaced projections provided on all said members, the projections of said individual members extending into spaces between the projections of said common member and forming two groups of enclosed chambers between said common member and each of said individual members, said chambers being arranged in a circle about said axis, portions rigid with said common member closing said chambers at both ends axially of said common member, means closing said chambers at their outsides radially of said common axis, the chambers of each group being connected with one another but shut off from the chambers of the other group, and a deformable medium completely filling the chambers of each group.

9. In combination, a common member, a plurality of individual members mounted for movement relative to said common member and relative to each other about a common axis, angularly spaced projections provided on all said members, the projections of said individual members extending into spaces between the projections of said common member and forming chambers side by side between said common member and the individual members, portions rigid with one of said members closing said chambers at both ends axially of said member, portions rigid with said individual members for closing said chambers at their outsides radially of said common axis, one of said members being formed with passages interconnecting the chambers on one side of the projections of said common member, said chambers being arranged in a circle about said axis, and a deformable medium completely filling said chambers.

10. The combination with a universal joint for connecting two end members which are movable relative to one another about two intersecting axes and which comprises a plurality of ring members that are mounted on one of said end members for movement relative to said one end member and relative to each other about one of said axes, and means rotatable about an axis radial of said one axis for connecting each of said ring members with the other end member, of a plurality of angularly spaced projections formed on said one end member, a plurality of angularly spaced projections formed on each of said ring members and extending into spaces between the projections of said one end member and forming chambers on the drive side between said one end member and each of said ring members, portions rigid with one of said members closing said chambers at both ends axially of said member, means closing said chambers at their outsides radially of said one axis, one of said members being formed with passages for interconnecting said chambers, and a deformable medium filling said chambers.

11. The combination with a universal joint for connecting two end members which are movable relative to one another about two intersecting axes and which comprises a plurality of ring members that are mounted on one of said end members for movement relative to said one end member and relative to each other about one of said axes, and means rotatable about an axis radial of said one axis for connecting each of said ring members with the other end member, of a plurality of angularly spaced projections formed on said one end member, a plurality of angularly spaced projections formed on each of said ring members and extending into spaces between the projections of said one end member and forming two separate groups of enclosed chambers between said one end member and said ring members, portions rigid with said common member closing said chambers at both ends axially of the common member, portions rigid with said ring members for closing said chambers at their outsides radial of said one axis, one of said groups of chambers being on the driving side and the other group being on the opposite side, the chambers of each group communicating with one another but being shut off from the chambers of the other group, and a deformable medium filling each group of chambers to maintain the total volume of the communicating chambers constant at all relative positions.

12. Mechanism for transmitting power through a plurality of operative connections in parallel comprising a common member and a plurality of individual members spaced about a common axis and mounted for movement about said axis relative to said common member and relative to each other, said common member having spline-shaped external projections thereon spaced about said common axis, said individual members being provided with internal projections that are positioned in the spaces between said spline-shaped projections and that are of less width than said spaces, one internal projection only engaging in a space and the internal projections of different individual members engaging in successive spaces, portions rigid with said common member closing said spaces at both axial ends thereof, means closing said spaces at their outsides radially of said common axis, said common member being formed with passages connecting the chambers which are formed on one side between the internal projections and the external projections, said common member being formed with separate passages connecting the chambers which are formed on the opposite side between the internal projections and the external projections, each group of chambers and connecting passages being shut off from the other group, and a deformable medium completely filling each group of chambers and passages.

13. The combination with a universal joint for connecting two end members which are movable relative to one another about two intersecting axes, one end member being provided with guide-ways spaced angularly about one of said axes, a plurality of holders mounted on the other end member for limited relative motion about the other of said axes, connecting members mounted on each of said holders for rotation about an axis radial of said other axis, the axis of rotation of the connecting members of one holder intersecting the axis of rotation of the connecting members of the other holder, and said connecting members engaging in the guide-ways of the first-named end member, of means for transmitting power between said other end member and the holders while permitting individual motion between said holders, said means comprising external spline-like projections provided on said other end member, internal projections formed on said holders engaging in the spaces formed between the external projections and separating each space into two chambers, one at each side of an internal projection, portions rigid with said other end member closing said chambers at both ends axially of said other end member, portions rigid with said holders for closing said chambers at their outsides radially of the axis of said other end member, the internal projections of the one holder being axially spaced relative to the internal projections of the other holder, both holders having an internal projection engaging in each of said spaces, and a deformable medium filling said chambers.

14. A universal joint comprising two end members with intersecting axes, a plurality of ring-shaped holders mounted on one of said end members for limited relative motion about the axis of said one end member, parts mounted on each holder in diametrically opposite positions to rotate about radial axes intersecting the axis of said one end member, the axis of rotation of the parts on one holder intersecting the axis of rotation of the parts on the other holder, said parts engaging equi-angularly spaced guide-ways provided in the other end member, said one end member being provided with angularly-spaced external projections, said holders having internal projections extending into the spaces between the external projections, and an elastic deformable medium in said spaces, and means for confining said medium for transmitting power between said projections.

15. Mechanism for transmitting power through a plurality of operative connections in parallel, comprising a common member, and a pair of individual members rotatably mounted on said common member and movable relative to said common member, and relative to each other, a rotatable part with which said individual members are operatively connected, a plurality of angularly spaced projections formed on said common member, a plurality of angularly spaced projections formed on each of said individual members, the projections of said individual members extending, respectively, into alternate spaces formed between the projections of said common member and forming with the projections of said common member chambers, portions rigid with one of said members closing said chambers at both ends axially of said one member, means for closing said chambers at their radial outsides, the chambers formed on the same side of the projections of the common member communicating with each other, and the chambers formed on one side of the projections of the common member being separate from the chambers formed on the other side of the projections of the common member, and a deformable medium completely filling said chambers and their communications.

16. Mechanism for transmitting power through a plurality of operative connections in parallel, comprising a common member, and a plurality of individual members rotatably mounted on said common member and rotatable relative to said common member and relative to each other, a rotatable part with which said individual members are operatively connected, a plurality of angularly spaced projections formed on said common member, a plurality of angularly spaced projections formed on each of said individual members, the equiangularly positioned projections of said individual members extending into the same spaces formed between the projections of said common member, and forming with the projections of said common member chambers, portions rigid with one of said members closing said chambers at both ends axially of said members, means for closing said chambers at their radial outsides, the chambers formed on the same side of the projections of the common member communicating with each other, and the chambers formed on one side of the projections of said common member being separate from the chambers formed on the other side of the projections of said common member, and a deformable medium completely filling said chambers and their communications.

17. A universal joint for connecting two end members with angularly disposed axes, comprising two oscillatory members mounted coaxially with one of said end members for oscillation relative to said one end member and to each other, the three coaxial members having projections, the projections of the two oscillatory members interengaging with the projections of said one end member and forming chambers on opposite sides of the projections of said one end member, portions rigid with one of said members closing said chambers at both ends axially of said one member, means for closing said chambers at their radial outsides, means for sealing off the chambers formed on one of said sides being sealed off from the chambers of the opposite side, a deformable and substantially incompressible medium completely filling said chambers to transmit torque between said three coaxial members, and means for transmitting torque between said two oscillatory members and the other end member.

18. A universal joint for connecting two end members with angularly disposed axes, comprising two oscillatory members mounted coaxially with one of said end members for oscillation relative to said one end member and to each other, the three coaxial members having projections, the projections of the two oscillatory members interengaging with the projections of said one end member and forming chambers on opposite sides of the projections of said one end member, parts rigid with said one end member for closing said chambers at their axial ends, parts rigid with said oscillatory members for closing said chambers at their radial outsides, means for sealing off the chambers formed on one of said sides of the projections of said one end member from the chambers at the opposite side of the projections of said one end member, a deformable medium completely filling said chambers to transmit torque between said three coaxial members, and means for transmitting torque between said two oscillatory members and the other end member.

19. A universal joint for connecting two end members with angularly disposed axes, comprising two oscillatory members mounted coaxially with one of said end members for oscillation relative to said one end member and to each other, the three coaxial members having projections, the projections of said two oscillatory members interengaging with the projections of said one end member and forming chambers on opposite sides of the projections of said one end member, portions rigid with said one end member closing said chambers at both axial ends, portions rigid with said oscillatory members for closing said chambers at their radial outsides, the projections of said two oscillatory members forming vanes movable relatively to said one end member, the projections of said two oscillatory members being proportioned for equal displacements relatively to said one end member, each chamber formed between said one end member and one of said two oscillatory members being directly connected with a chamber formed between said one end member and the other of said two oscillatory members on the same side of the projections of said one end member, the chambers formed on one of said sides of the projections of said one end member being sealed off from the chambers formed on the opposite side of the projections of said one end member, a deformable medium completely filling said chambers to transmit torque between said three coaxial members, and means for transmitting torque between said two oscillatory members and the other end member.

20. A universal joint for connecting two end members with angularly disposed axes, comprising a plurality of oscillatory members mounted coaxially with one of said end members for oscillation relative to said one end member and to each other, all said coaxial members having projections, the projections of said oscillatory members interengaging with the projections of said one end member and forming chambers on opposite sides of the projections of said one end member, portions rigid with said one end member closing said chambers at both axial ends, means for closing said chambers at their radial outsides, means for sealing off the chambers formed on one of said sides of the projections of said one end member from the chambers at the opposite side of the projections of said one end member, a deformable medium completely filling said chambers to transmit torque between all of said coaxial members, and means for transmitting torque between said plurality of oscillatory members and the other end member.

ERNEST WILDHABER.

References Cited in the file of this patent

UNITED STATES PATENTS

| Number | Name | Date |
|---|---|---|
| 1,392,755 | Francke | Oct. 4, 1921 |
| 1,498,678 | Chavrier | June 24, 1924 |
| 2,024,777 | Neumann | Dec. 17, 1935 |
| 2,050,085 | Ilseman | Aug. 18, 1936 |
| 2,231,784 | Von Thungen | Feb. 11, 1941 |
| 2,235,002 | Anderson | Mar. 18, 1941 |
| 2,386,367 | Taylor | Oct. 9, 1945 |

FOREIGN PATENTS

| Number | Country | Date |
|---|---|---|
| 250,987 | Switzerland | 1948 |